US009465254B2

United States Patent
Hisakabe et al.

(10) Patent No.: US 9,465,254 B2
(45) Date of Patent: Oct. 11, 2016

(54) LIQUID CRYSTAL DISPLAY DEVICE HAVING AN ALIGNMENT FILM COMPRISING AN INCLINED SURFACE INSIDE AN EDGE-PART AREA

(71) Applicant: Panasonic Liquid Crystal Display Co., Ltd., Himeji-shi, Hyogo (JP)

(72) Inventors: Michinori Hisakabe, Hyogo (JP); Hiroshi Tsutsumi, Hyogo (JP); Hayami Tabira, Hyogo (JP)

(73) Assignee: Panasonic Liquid Crystal Diplay Co., Ltd., Hyogo (JP)

( * ) Notice: Subject to any disclaimer, the term of this patent is extended or adjusted under 35 U.S.C. 154(b) by 133 days.

(21) Appl. No.: 14/196,499

(22) Filed: Mar. 4, 2014

(65) Prior Publication Data

US 2015/0116616 A1   Apr. 30, 2015

(30) Foreign Application Priority Data

Oct. 31, 2013   (JP) .................. 2013-227579

(51) Int. Cl.
*G02F 1/1337*   (2006.01)
*G02F 1/1333*   (2006.01)

(52) U.S. Cl.
CPC .......... *G02F 1/13378* (2013.01); *G02F 2001/133388* (2013.01)

(58) Field of Classification Search
CPC .......... G02F 1/1337; G02F 1/133788; G02F 1/133711; G02F 2001/133388; G02F 2001/1337; G02F 2001/133738; G02F 2001/133769; G02F 2001/133776; G02F 2001/13787

See application file for complete search history.

(56) References Cited

U.S. PATENT DOCUMENTS

| | | | | |
|---|---|---|---|---|
| 2003/0184705 A1* | 10/2003 | Murade | ............... | G02F 1/13454 349/158 |
| 2009/0110868 A1* | 4/2009 | Suzuki | ............. | G02F 1/133711 428/78 |
| 2011/0206832 A1 | 8/2011 | Obata et al. | | |
| 2012/0300145 A1* | 11/2012 | Sonoda | ............. | G02F 1/133723 349/33 |

FOREIGN PATENT DOCUMENTS

| | | |
|---|---|---|
| JP | 2012-133137 | 7/2012 |
| WO | 2010/058718 | 5/2010 |

* cited by examiner

*Primary Examiner* — Paul Lee
(74) *Attorney, Agent, or Firm* — Hamre, Schumann, Mueller & Larson, P.C.

(57) ABSTRACT

In the first substrate of a liquid crystal display device, a plurality of gate lines that extend along the row direction, a plurality of data lines that extend along the column direction, a plurality of pixel electrodes and a plurality of thin film transistors that are placed respectively in association with a plurality of pixels that are formed in the row direction and the column direction, and an alignment film, are formed, and the thickness of the alignment film in an edge-part area, which is an area of a predetermined width from an edge part of an image display area that is formed with the plurality of pixels, is thinner than the thickness of the alignment film in the center part of the image display area.

7 Claims, 10 Drawing Sheets

LIQUID CRYSTAL DISPLAY DEVICE HAVING AN ALIGNMENT FILM COMPRISING AN INCLINED SURFACE INSIDE AN EDGE-PART AREA

CROSS-REFERENCE TO RELATED APPLICATION

The present application claims priority from Japanese application JP2013-227579 filed on Oct. 31, 2013, the content of which is hereby incorporated by reference into this application.

TECHNICAL FIELD

The present application relates to alignment films for liquid crystal display devices.

BACKGROUND

In a liquid crystal display device, each of a pair of substrates that are placed opposite each other via a liquid crystal layer has an alignment film for aligning liquid crystal molecules formed on its side facing the liquid crystal layer. Conventionally, it is known that variability produced in the thickness of an alignment film causes a decrease in the quality of the display (for example, irregularities in the display). Then, various methods of forming alignment films for reducing irregularities in the display produced due to variability in the thickness of alignment films have been proposed.

For example, the publication WO2010/058718 discloses a method of forming an alignment film using an ink jet method. An ink jet method refers to a method of forming alignment films by discharging droplets of the alignment film material over the entire surface of a substrate from ink jet nozzles. According to the method disclosed in the above publication, irregularities in the display, mentioned above, are reduced by adjusting the direction in which the ink jet nozzles to discharge droplets of the alignment film material move.

SUMMARY

However, even with the method disclosed in the above publication, there is a problem that the thickness of the alignment film becomes thicker in the edge parts of the image display area (effective pixel area) and that irregularities in the display are produced in these edge parts. The mechanism by which the thickness of an alignment film becomes thicker in the edge parts of an image display area will be described below. The alignment film material has wettability. Consequently, the alignment film material, after being discharged in droplets on the image display area on a substrate, spreads toward the peripheries (frame areas) of the image display area. Steps are formed near the borders between the image display area and the frame areas due to differences in the layer structure and so on. Consequently, the alignment film material that is spread hits and bounces off the steps. By this means, in the edge parts of the image display area, the alignment film material swells, and the thickness of the alignment film becomes thicker.

The present invention has been made in view of the above circumstances, and it is therefore an object of the present invention to provide a liquid crystal display device and its manufacturing method, whereby irregularities in the display due to variability in the thickness of an alignment film can be reduced.

In order to solve the above problem, in a liquid crystal display device according to one embodiment of the present application, the liquid crystal display device has the first substrate on the back surface side and a second substrate on the display surface side, which are placed opposite to each other via a liquid crystal layer, wherein: the first substrate comprises: a plurality of gate lines extending in the row direction, which are formed thereon; a plurality of data lines extending in the column direction, which are formed thereon; a plurality of pixel electrodes and a plurality of thin film transistors that are placed respectively in association with a plurality of pixels that are formed in the row direction and the column direction; and an alignment film formed thereon, and the thickness of the alignment film in an edge-part area, which is an area of a predetermined width from an edge part of an image display area that is formed with the plurality of pixels, is thinner than the thickness of the alignment film in the center part of the image display area.

In the liquid crystal display device according to one embodiment of the present application, in the edge-part area, the thickness of the alignment film becomes thinner in nearer the edge part of the image display area.

In the liquid crystal display device according to one embodiment of the present application, the thickness of the alignment film of the edge part is the thinnest in the image display area.

In the liquid crystal display device according to one embodiment of the present application, the predetermined width has a range of 1 mm to 5 mm.

In the liquid crystal display device according to one embodiment of the present application, the thickness of the alignment film in the edge part of the image display area may be 10 nm to 20 nm thinner than the thickness of the alignment film in the center part.

In the liquid crystal display device according to one embodiment of the present application, the predetermined width in an edge-part area that neighbors an area where a drive circuit is formed may be wider than the predetermined width in another edge-part area that is located on the opposite side from the area where the drive circuit is formed and that faces the edge-part area.

In the liquid crystal display device according to one embodiment of the present application, a photo-alignment process may be applied to the alignment film.

In order to solve the above problem, a method of manufacturing a liquid crystal display device according to one embodiment of the present application, where the liquid crystal display device has the first substrate on the back surface side and a second substrate on the display surface side, which are placed opposite to each other via a liquid crystal layer, and includes, in the first substrate, a plurality of gate lines that are formed to extend along the row direction, a plurality of data lines that are formed to extend along the column direction, a plurality of pixel electrodes and a plurality of thin film transistors that are placed respectively in association with a plurality of pixels that are formed in the row direction and the column direction, and an alignment film that is formed by an ink jet method, includes the first step of applying the material of the alignment film to the entire image display area that is formed with the plurality of pixels, and a second step of, after the first step, applying the material of the alignment film to the area in the image display area excluding a predetermined width from an edge part of the image display area.

In the method of manufacturing the liquid crystal display device according to one embodiment of the present application, in the first step, the material of the alignment film is preferably applied beyond the image display area.

In order to solve the above problem, in a method of manufacturing a liquid crystal display device according to one embodiment of the present application, where the liquid crystal display device has the first substrate on the back surface side and a second substrate on the display surface side, which are placed opposite to each other via a liquid crystal layer, and includes, in the first substrate, a plurality of gate lines that are formed to extend along the row direction, a plurality of data lines that are formed to extend along the column direction, a plurality of pixel electrodes and a plurality of thin film transistors that are placed respectively in association with a plurality of pixels that are formed in the row direction and the column direction, and an alignment film that is formed by an ink jet method, the amount of droplets of the material of the alignment film to discharge on an edge-part area, which is an area of a predetermined width from an edge part of an image display area that is formed with the plurality of pixels, is made smaller than the amount of droplets of the material of the alignment film to discharge on an area on the inner side of the edge-part area in the image display area.

In order to solve the above problem, in a method of manufacturing a liquid crystal display device according to one embodiment of the present application, where the liquid crystal display device has the first substrate on the back surface side and a second substrate on the display surface side, which are placed opposite to each other via a liquid crystal layer, and includes, in the first substrate, a plurality of gate lines that are formed to extend along the row direction, a plurality of data lines that are formed to extend along the column direction, a plurality of pixel electrodes and a plurality of thin film transistors that are placed respectively in association with a plurality of pixels that are formed in the row direction and the column direction, and an alignment film that is formed by an ink jet method, the substrate and a droplet discharging device that discharges droplets of the material of the alignment film on the substrate are moved relatively, and the relative speed of the substrate and the droplet discharging device when the droplets of the material of the alignment film are discharged on an edge-part area, which is an area of a predetermined width from an edge part of an image display area that is formed with the plurality of pixels, is made faster than the relative speed of the substrate and the droplet discharging device when the droplets of the material of the alignment film are discharged on an area on the inner side of the edge-part area of the image display area.

A method of manufacturing the liquid crystal display device according to one embodiment of the present application may include a step of applying a photo-alignment process to the alignment film.

DETAILED DESCRIPTION

An embodiment of the present application will be described below with reference to the accompanying drawings.

Figure 1:
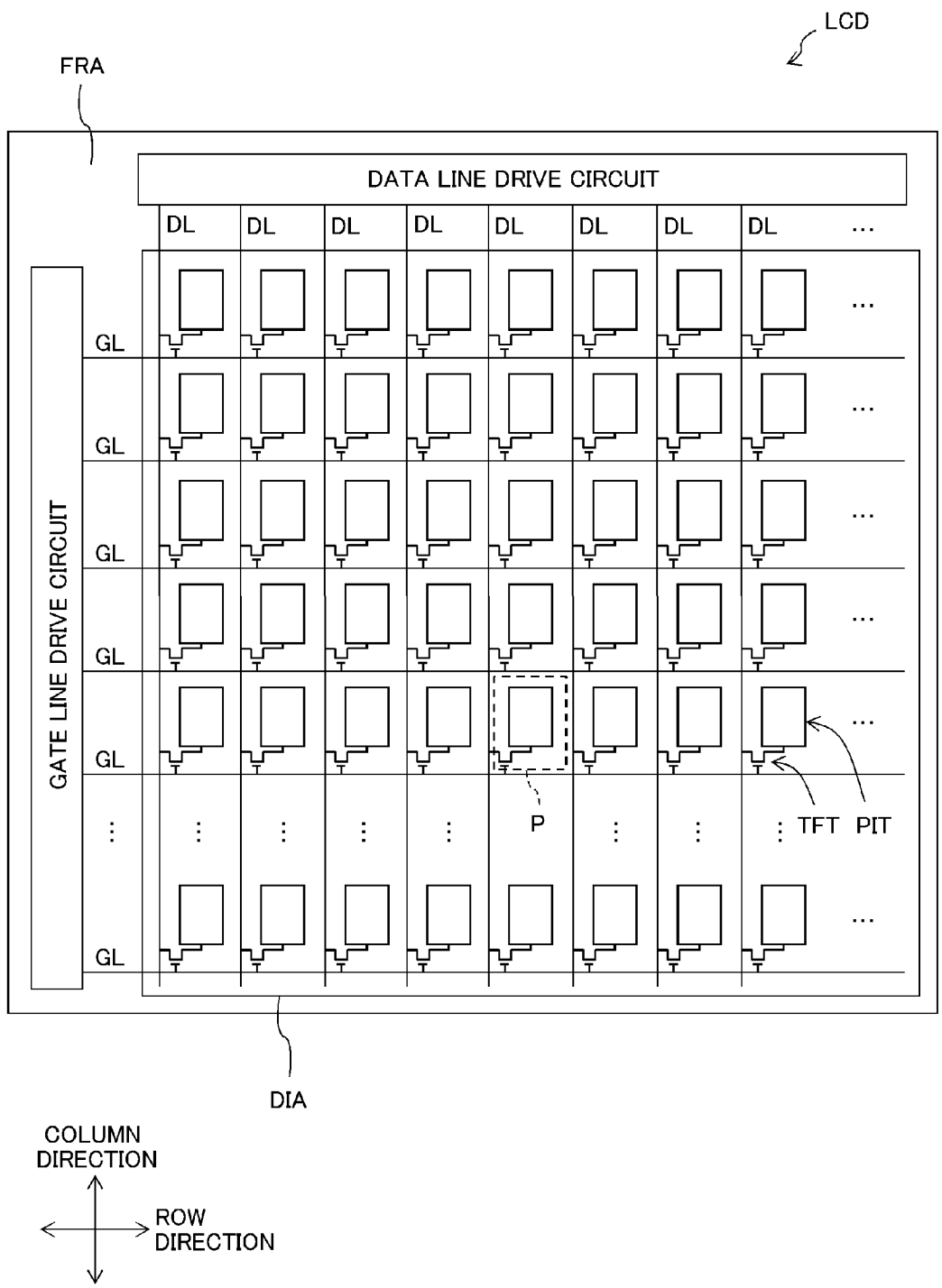
FIG. 1 is a plan view showing an overall configuration of a liquid crystal display device according to an embodiment of the present application.

FIG. 1 is a plan view showing an overall configuration of a liquid crystal display device according to the present embodiment. To divide into areas roughly, the liquid crystal display device LCD is formed with an image display area DIA, and frame areas FRA, which are the surrounding areas of the image display area DIA. In the image display area DIA, a plurality of pixels P, each surrounded by two neighboring gate lines GL and two neighboring data lines DL, are arranged along the row direction and the column direction, in a matrix shape. That is, the image display area DIA can be defined as an aggregated area (effective pixel area) of a plurality of pixels P. Note that the direction along which the gate lines GL extend are the row direction (the left and right directions in the drawing), and the direction along which the data lines DL extend are the column direction (the upward and downward directions in the drawing). In the frame areas FRA, a gate line drive circuit that drives the gate lines GL, and a data line drive circuit that drives the data lines DL are formed.

Figure 2:
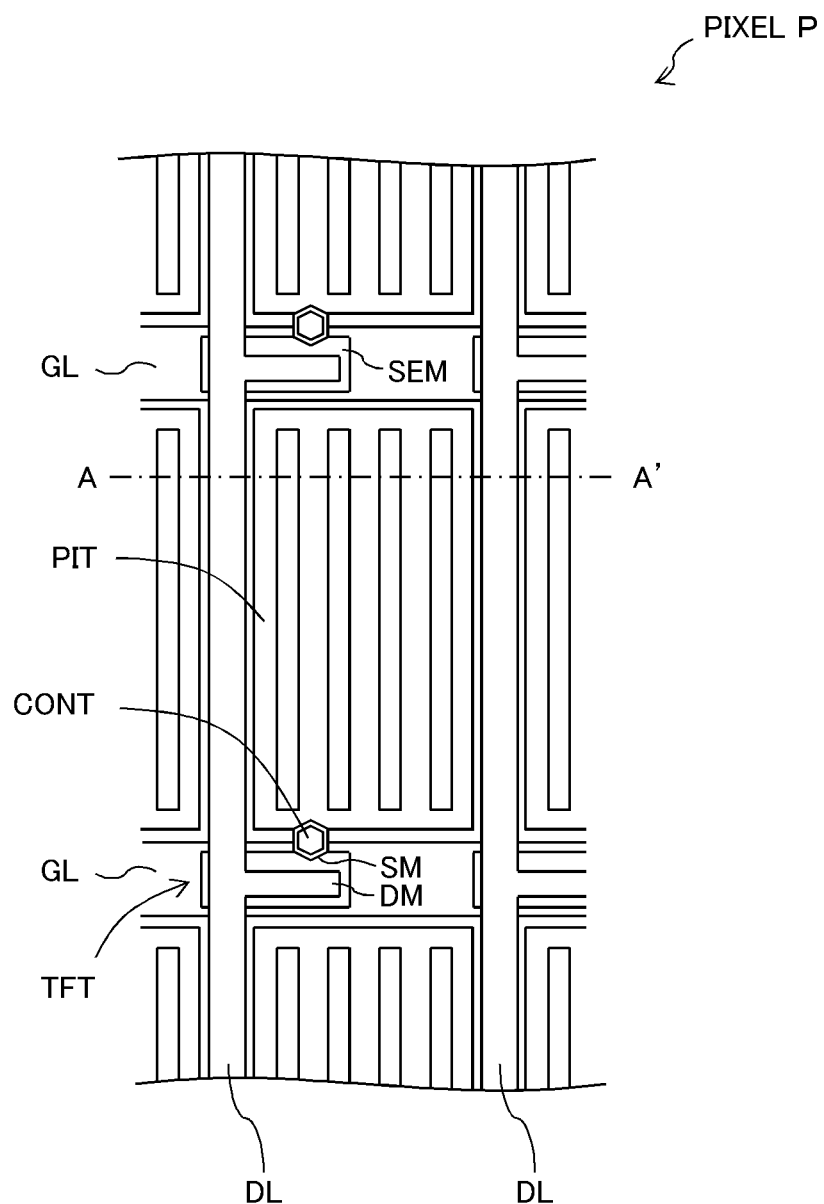
FIG. 2 is a plan view of pixels in the liquid crystal display device shown in FIG. 1.
Figure 3:
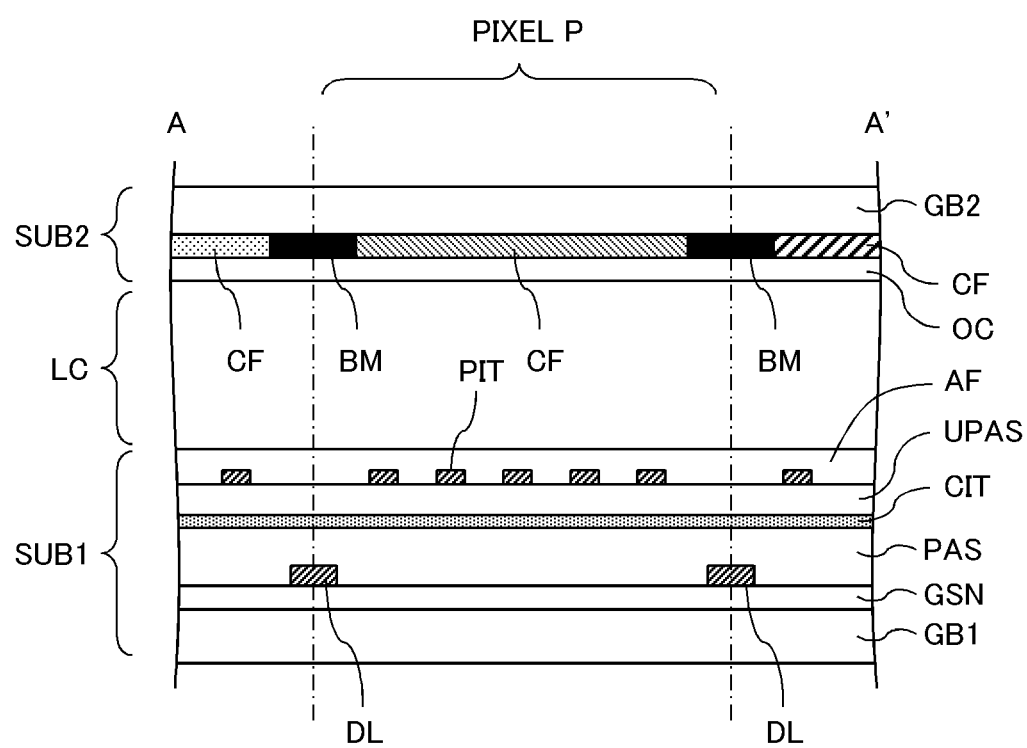
FIG. 3 shows the A-A' cross-section of FIG. 2.

FIG. 2 is a plan view showing part of the configuration of the image display area DIA. FIG. 3 shows the A-A' cross-section of FIG. 2. As shown in FIG. 3, the pixels P include a thin film transistor substrate SUB1 (hereinafter referred to as the "TFT substrate") (the first substrate), which is placed on the back surface side, a color filter substrate SUB2 (hereinafter referred to as the "CF substrate") (the second substrate), which is placed on the display surface side and faces the TFT substrate SUB1, and a liquid crystal layer LC, which is sandwiched and held between the TFT substrate SUB1 and the CF substrate SUB2. Note that, for ease of understanding, FIG. 2 illustrates a state in which the TFT substrate SUB1 is seen from the display surface side through the CF substrate SUB2.

In the TFT substrate SUB1, a plurality of data lines DL that extend along the column direction and a plurality of gate lines GL that extend along the row direction are formed, and, near each place where the plurality of data lines DL and the plurality of gate lines GL cross, a thin film transistor TFT is formed.

In a pixel P, a pixel electrode PIT, formed of a transparent conductive film of a tin-doped indium oxide (ITO) or the like, is formed. As shown in FIG. 2, a pixel electrode PIT has opening parts (for example, slits) and is formed in stripes. In a thin film transistor TFT, a semiconductor layer SEM that is made of amorphous silicon (aSi) is formed on a gate insulating film GSN (see FIG. 3), and a drain electrode DM and a source electrode SM are formed on the semiconductor layer SEM (see FIG. 2). The drain electrode DM is electrically connected to a data line DL. The source electrode SM and the pixel electrode PIT are electrically connected with each other via a contact hole CONT.

The layered structure of each part constituting the pixels P is not limited to the configuration of FIG. 3, and it is equally possible to apply configurations that have been known. In the configuration shown in FIG. 3, in the TFT substrate SUB1, gate lines GL (not shown) are formed on the glass substrate GB1, and a gate insulating film GSN is formed to cover the gate lines GL. Also, data lines DL are formed on the gate insulating film GSN, and an insulating film PAS is formed to cover the data lines DL. Also, a common electrode CIT is formed on the insulating film PAS, and an upper-layer insulating film UPAS is formed to cover the common electrode CIT. Furthermore, pixel electrodes PIT are formed on the upper-layer insulating film UPAS, and an alignment film AF is formed to cover the pixel electrodes PIT. Besides, although not illustrated, a polarizing plate and so on are formed in the TFT substrate SUB1.

Also, in the CF substrate SUB2, black matrices BM and colored parts CF (for example, a red color part, a green color part, and a blue color part) are formed on a glass substrate GB2, and an overcoat layer OC is formed to cover these. Besides, although not illustrated, an alignment film, a polarizing plate and so on are formed in the CF substrate SUB2.

According to the configuration shown in FIG. 3, the liquid crystal display device LCD has what may be referred to as an IPS (In Plane Switching)-based configuration, but the liquid crystal display device according to the present application is not limited to this.

Next, the method of driving the liquid crystal display device LCD will be described briefly. A gate voltage for scanning that is output from the gate line drive circuit is supplied to the gate lines GL, and a data voltage for images that is output from the data line drive circuit is supplied to the data lines DL. When a gate ON voltage is supplied to the gate lines GL, the resistance of the semiconductor layer SEM of the thin film transistor TFT becomes lower, and the data voltage that is supplied to the data lines DL is supplied to the pixel electrodes PIT that are electrically connected to the source electrodes SM, via the source electrodes SM. Also, a common voltage that is output from a common electrode drive circuit (not shown) is supplied to the common electrode CIT. By this means, an electric field (drive electric field) is generated between the pixel electrodes PIT and the common electrode CIT, so that the liquid crystal layer LC is driven by the electric field, and images are displayed.

Figure 4:
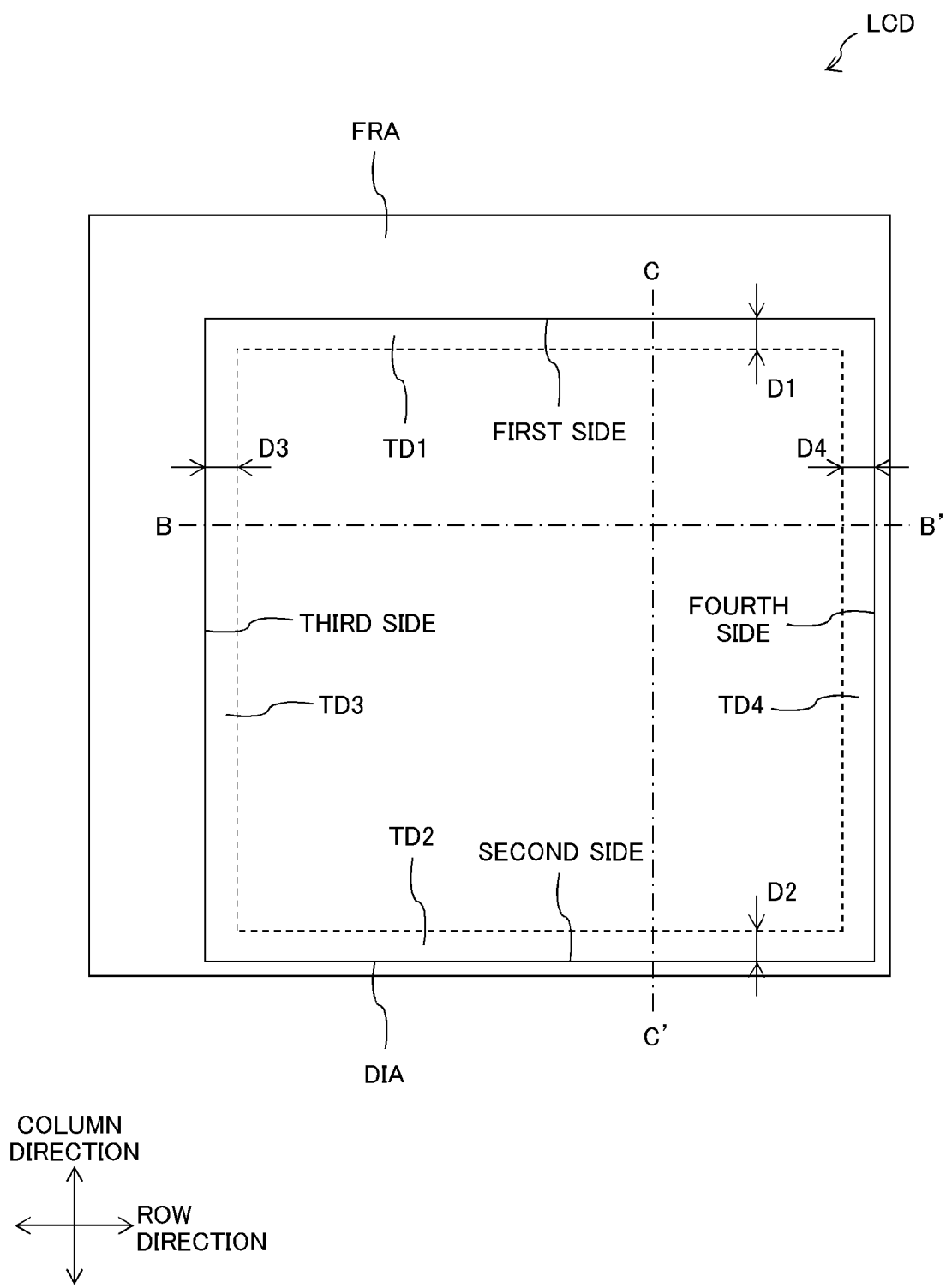
FIG. 4 is a plan view showing an image display area and frame areas.

Next, the specific configuration of the alignment film AF will be described. FIG. 4 is a plan view showing the image display area DIA and the frame areas FRA. In FIG. 4, the drive circuits, the signal lines and the pixels shown in FIG. 1 are omitted.

As shown in FIG. 4, the image display area DIA is constituted of the first side, which marks an edge part neighboring the area where the data line drive circuit is formed, a second side, which is located on the opposite side from the area where the data line drive circuit is formed and which faces the first side, a third side, which marks an edge part neighboring the area where the gate line drive circuit is formed, and a fourth side, which is located on the opposite side from the area where the gate line drive circuit is formed and which faces the third side, and is formed in a rectangular shape. The area of a predetermined width D from each side (each edge part) constituting the image display area DIA will be referred to as an "edge-part area TD." The edge-part areas TD are formed with the first edge-part area TD1 of a predetermined width D1, including the first side, a second edge-part area TD2 of a predetermined width D2, including the second side, a third edge-part area TD3 of a predetermined width D3, including the third side, and a fourth edge-part area TD4 of a predetermined width D4, including the fourth side, and is formed in a frame shape (in a framework shape).

The frame areas FRA are formed in the peripheries of the image display area DIA so as to surround image display area DIA. Among the frame areas FRA, the area in which the data line drive circuit is formed and which neighbors the first edge-part area TD1 is wider than the area that is located on the opposite side from the area where the data line drive circuit is formed and that neighbors the second edge-part area TD2. Similarly, among the frame areas FRA, the area in which the gate line drive circuit is formed and which neighbors the third edge-part area TD3 is wider than the area that is located on the opposite side from the area where the gate line drive circuit is formed and that neighbors the fourth edge-part area TD4.

Figure 5:
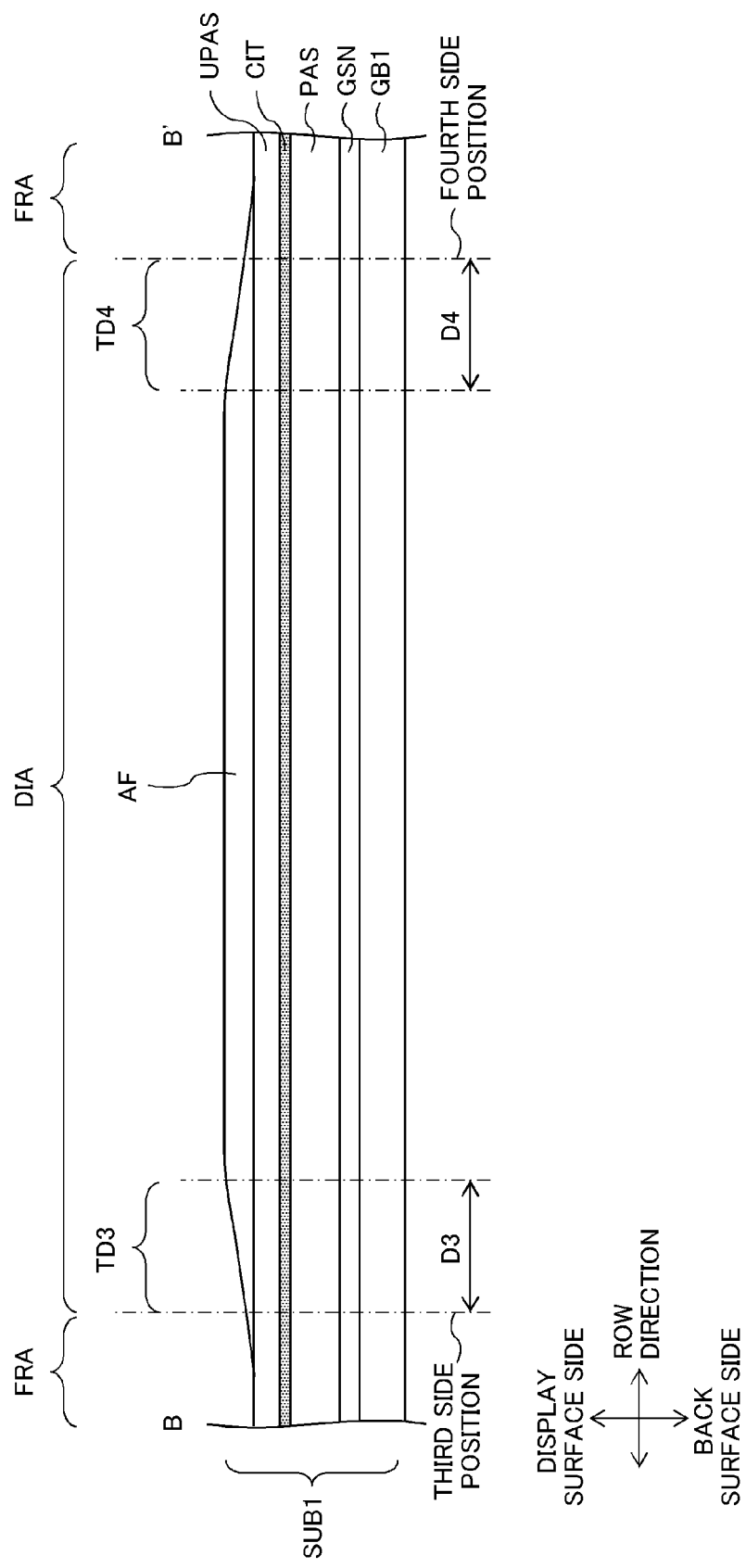
FIG. 5 shows the B-B' cross-section of FIG. 4.
Figure 6:
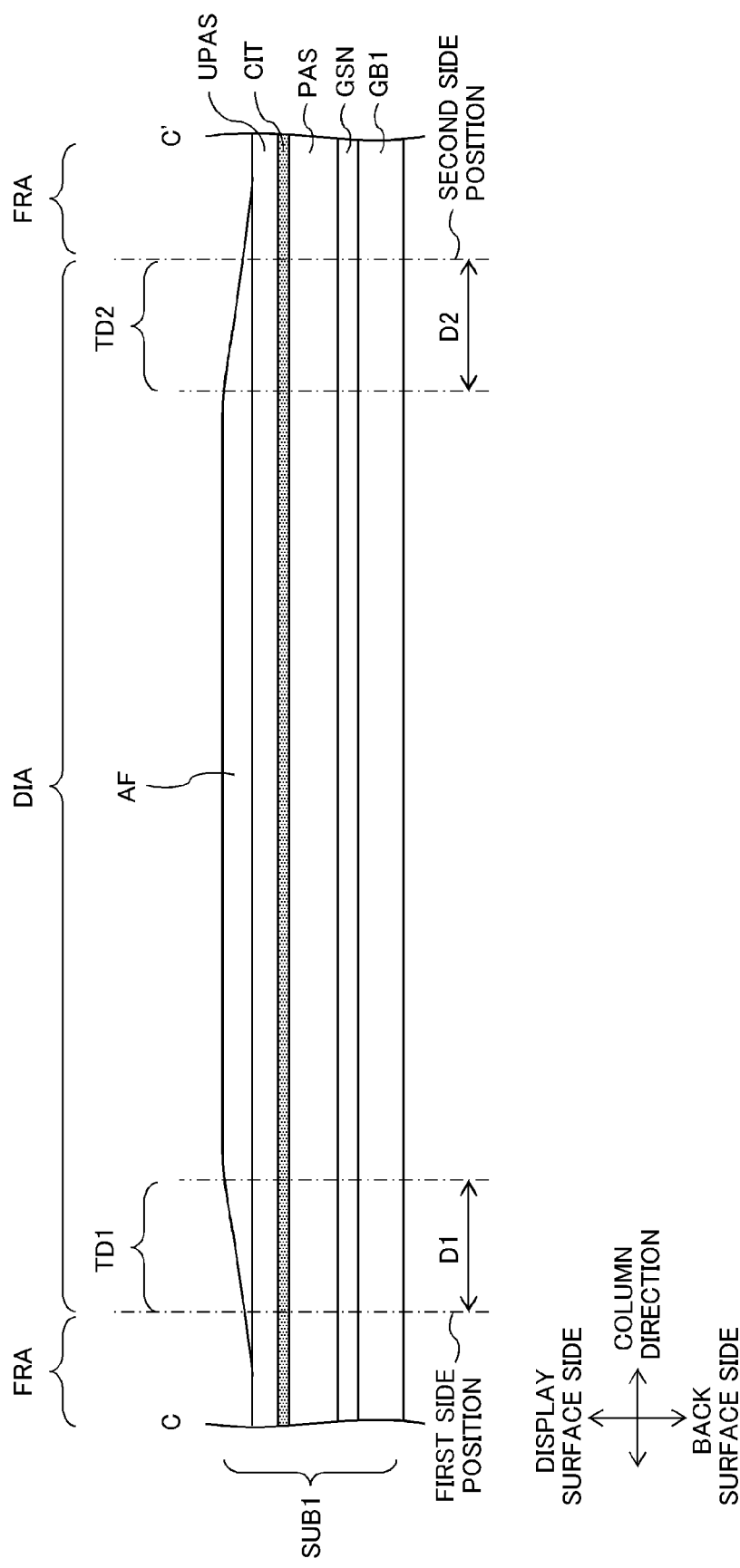
FIG. 6 shows the C-C' cross-section of FIG. 4.

FIG. 5 shows the B-B' cross-section of FIG. 4. FIG. 6 shows the C-C' cross-section of FIG. 4. Here, for ease of understanding, the data lines DL, the gate lines GL, and the pixel electrodes PIT are omitted. As shown in FIG. 5 and FIG. 6, the thickness of the alignment film AF in the edge-part areas TD is thinner than the thickness of alignment film AF in the center part (the area on the inner side of the edge-part areas TD) of the image display area DIA. Also, in the edge-part areas TD, the thickness of the alignment film AF becomes thinner nearer the edge parts (the first side to the fourth side) of the image display area DIA. Furthermore, inside the image display area DIA, the thickness of the alignment film AF becomes the thinnest in the edge parts of the image display area DIA.

The respective predetermined widths D1 to D4 of the edge-part areas TD1 to TD4 are each set in a range of, for example, 1 mm to 5 mm. The predetermined widths D1 to D4 may be equal to each other or may vary. Preferably, the predetermined width D1 of the edge-part area TD1 that neighbors the area where the data line drive circuit is formed is wider than the predetermined width D2 of the edge-part area TD2 that is located on the opposite side from the area where the data line drive circuit is formed and that faces the edge-part area TD1 (D1>D2). Also, preferably, the predetermined width D3 of the edge-part area TD3 that neighbors the area where the gate line drive circuit is formed is wider than the predetermined width D4 of the edge-part area TD4 that is located on the opposite side from the area where the gate line drive circuit is formed and that faces the edge-part area TD3 (D3>D4). The steps that are formed in the borders between the image display area DIA and the frame areas FRA are bigger in the edge-part area TD1 than in the edge-part area TD2 and are bigger in the edge-part area TD3 than in the edge-part area TD4. Consequently, by making the predetermined width D1 wider than the predetermined width D2 and making the predetermined width D3 wider than the predetermined width D4, it is possible to adjust the influence of the alignment film material that spreads and bounces back.

Figure 7:
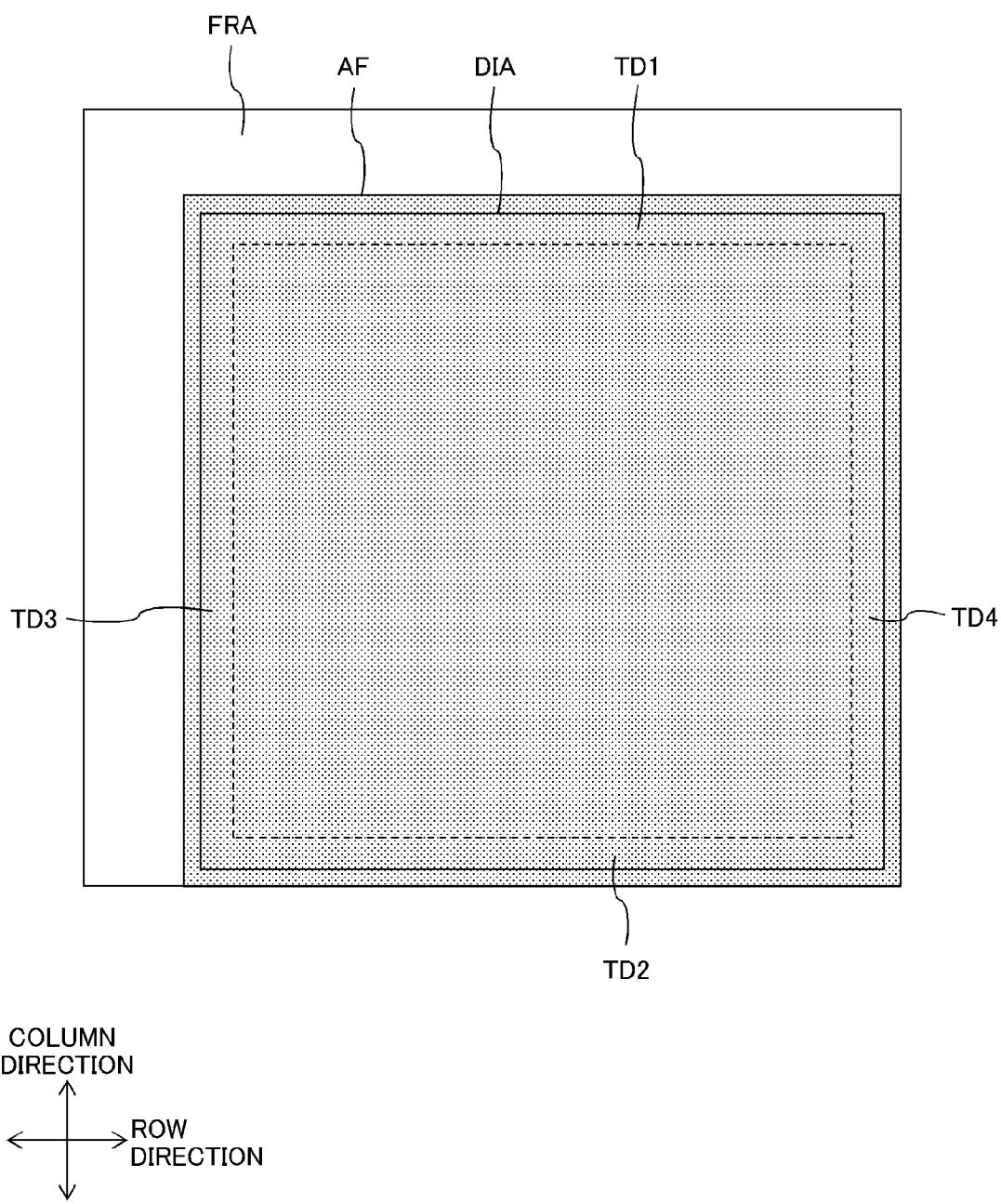
FIG. 7 is a plan view showing an area where an alignment film is formed.

FIG. 7 is a plan view showing the area where the alignment film AF is formed. The area where the alignment film AF is formed is the area shown as the shaded part. As shown in FIG. 5 to FIG. 7, the alignment film AF stretches beyond the image display area DIA and reaches the frame areas FRA. The thickness of the alignment film AF that sticks out into the frame areas FRA is thinner than the thickness of the alignment film AF that is formed inside the image display area DIA.

With the present liquid crystal display device LCD, as described above, in the edge-part areas TD of the image display area DIA, the thickness of the alignment film AF becomes gradually thinner nearer the edge parts. Consequently, in the edge parts of the image display area DIA, it is possible to reduce irregularities in the display which are produced as the alignment film material swells and the thickness of the alignment film becomes thicker. The method of forming the alignment film AF having the above configuration will be described later.

Next, an example of the method of manufacturing the TFT substrate SUB1 will be described.

First, a film of a metal material, which becomes the gate lines GL, is formed on the glass substrate GB1 by sputtering. Next, patterns are formed using half-tone exposure in a photo-etching step. By this means, the gate lines GL are formed. Next, by the chemical vapor deposition method CVD, a gate insulating film GSN of silicon nitride is formed to cover the gate lines GL. Next, a semiconductor layer SEM of amorphous silicon, oxide IGZO or the like is laminated upon the gate insulating film GSN. Next, a laminated film of molybdenum Mo and copper Cu is formed on the semiconductor layer SEM by sputtering. The data lines DL (drain electrodes DM) and the source electrodes SM, which are connected to the pixel electrodes PIT, are formed at the same time.

Next, an insulating film PAS is formed to cover the semiconductor layer SEM, the data lines DL and the source electrodes SM. Next, a common electrode CIT, made of ITO, is formed on the insulating film PAS. Next, an upper-layer insulating film UPAS is formed to cover the common electrode CIT. Next, a film of ITO, which is a transparent electrode material, is formed on the upper-layer insulating film UPAS, and pixel electrodes PIT are formed by the photo-etching process. A pixel electrode PIT is formed on the source electrode SM in a contact hole CONT. By this means, the pixel electrode PIT and the source electrode SM are electrically connected.

Next, the material of the alignment film AF (for example, polyimide resin) is applied by an ink jet method, to cover the pixel electrodes PIT. After the application, the alignment film material is dried, and the alignment film AF is formed. Next, a rubbing process is applied to the alignment film AF. Note that, when forming a photo-alignment film, predetermined polarized ultraviolet rays are radiated on the alignment film AF (photo-alignment process). In particular, when using a photo-alignment film, irregularities in the display due to variability in the thickness of the alignment film are more visible, and therefore the advantages of the present invention become more obvious. Through the above steps, the TFT substrate SUB1 is manufactured. Note that the CF substrate SUB2 can be manufactured by a manufacturing method that has been known.

[Method of Forming Alignment Film]

Next, specific methods of forming the alignment film AF will be described. Here, the first to third forming methods will be described. The alignment film AF is formed by discharging droplets of the alignment film material by an ink jet method.

Figure 8:
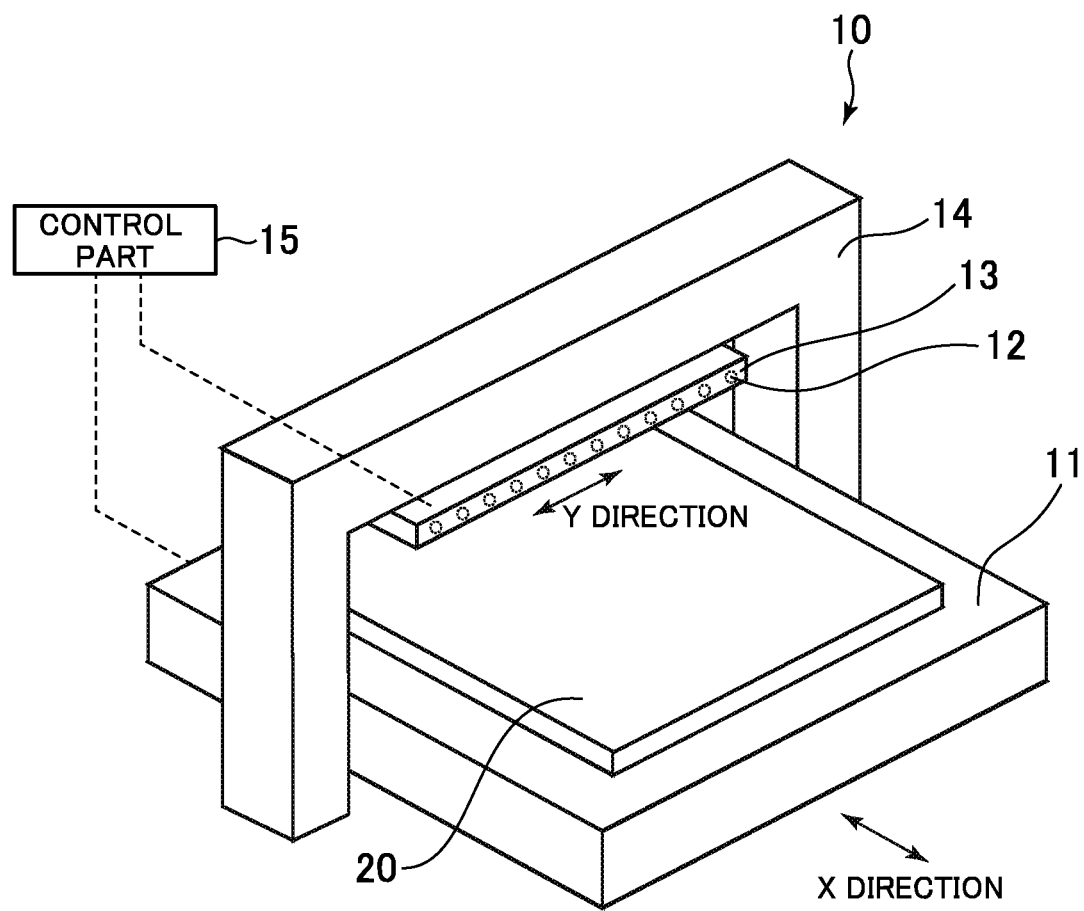
FIG. 8 is a schematic view showing a configuration of an ink jet device.

FIG. 8 is a schematic view showing a configuration of an ink jet device (droplet discharging device) that discharges droplets of the alignment film material on the substrate. An ink jet device 10 has a stage 11, on which a substrate 20 is placed movably, a head 13, which has a plurality of nozzles 12 that discharge the alignment film material (in droplets), a frame 14, which supports the head 13 movably, and a control part 15, which controls the speed at which the substrate 20 and the head 13 move, the amount of the alignment film material to discharge (the amount of droplets to discharge), the frequency of application, and so on. Here, assuming that the direction in which the substrate 20 moves is X direction, the head 13 moves in Y direction (which is direction orthogonal to the X direction). Note that the substrate 20 may move in the X direction on the stage 11, or the stage 11, with the substrate 20 fixed thereon, may move in the X direction. Also, the substrate 20 that is placed on the stage 11 is the TFT substrate SUB1 before the alignment film is formed.

[First Forming Method]

Figure 9A:
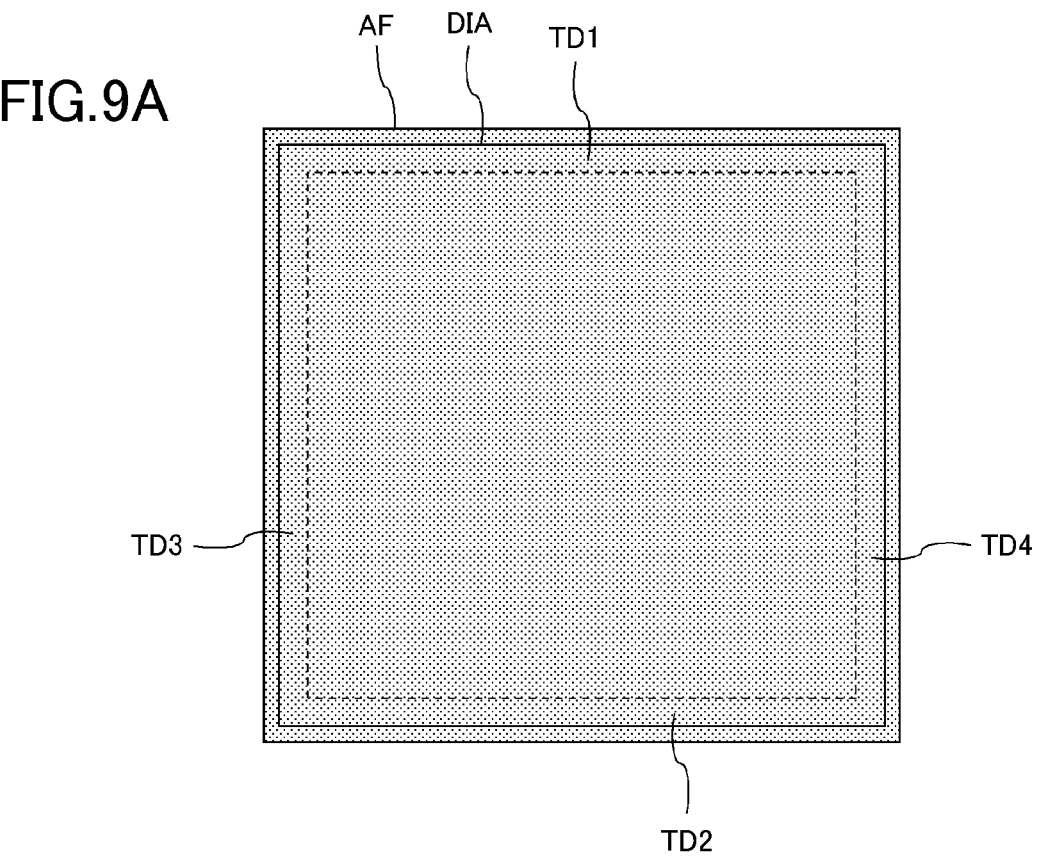
FIG. 9A is a plan view showing the range of the first application of the alignment film material.
Figure 9B:
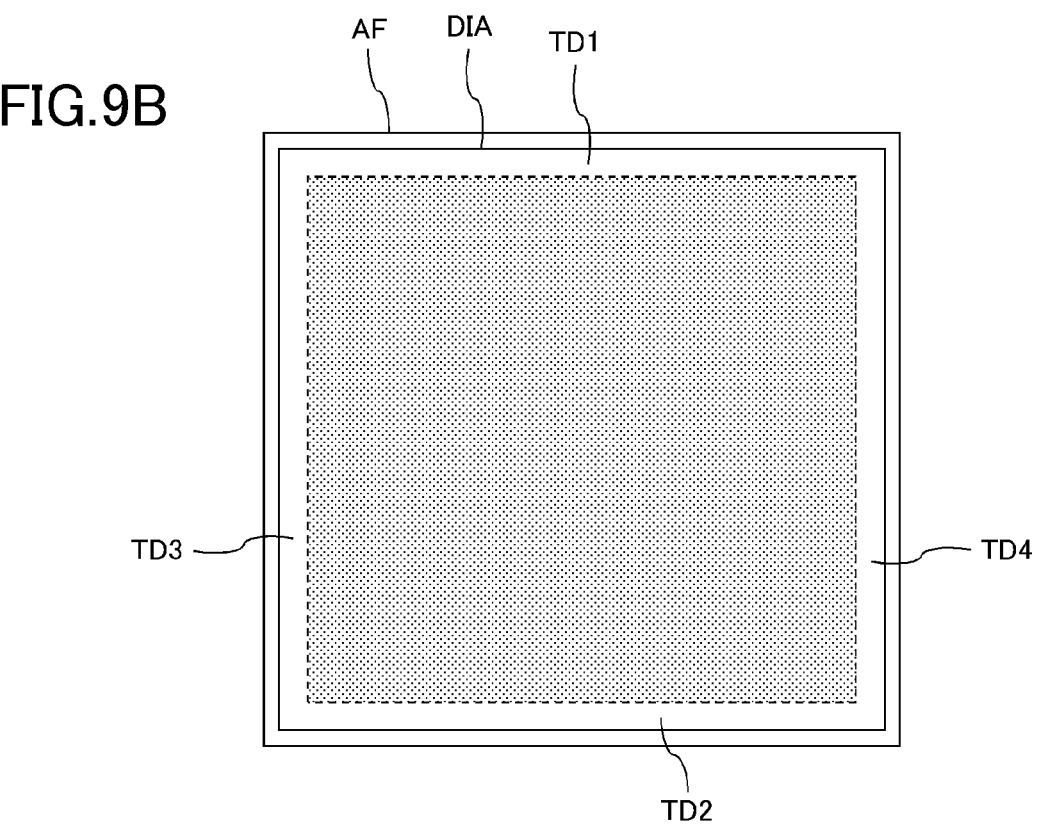
FIG. 9B is a plan view showing the range of the second application of the alignment film material.

FIG. 9 is a plan view showing the first forming method. With the first forming method, in the first application step (the first step), as shown in FIG. 9A, the alignment film material is discharged in droplets over the entire image display area DIA. After that, following this, in the second application step (the second step), as shown in FIG. 9B, the alignment film material is discharged in droplets on the area in the image display area DIA excluding the predetermined widths D (edge-part areas TD) from the edge parts of the image display area DIA. In FIG. 9A and FIG. 9B, the shaded part shows the range where the alignment film material is applied.

In the first step, preferably, droplets of the alignment film material are discharged so as to go beyond the image display area DIA and reach the frame areas FRA. By this means, the alignment film AF can be formed over the entire image display area DIA. Also, the direction of application in the first step and the direction of application in the second step may be the same direction, but is preferably mutually opposite direction, from the perspective of work efficiency. Also, a configuration in which the substrate 20 is fixed and the frame 14 moves in the X direction is also possible. That is, the substrate 20 that is placed on the stage 11, and the head 13 that discharges the alignment film material, have only to be configured to be able to move relatively in the X direction.

With the above forming method, in the first step, the alignment film material spreads over the entire image display area DIA, so that the thickness of the image display area DIA becomes virtually uniform. After that, in the second step, the alignment film material that is discharged in droplets upon the alignment film material applied in the first step spreads to the edge-part areas TD. By this means, the alignment film AF shown in FIG. 5 and FIG. 6 is formed.

Figure 10:
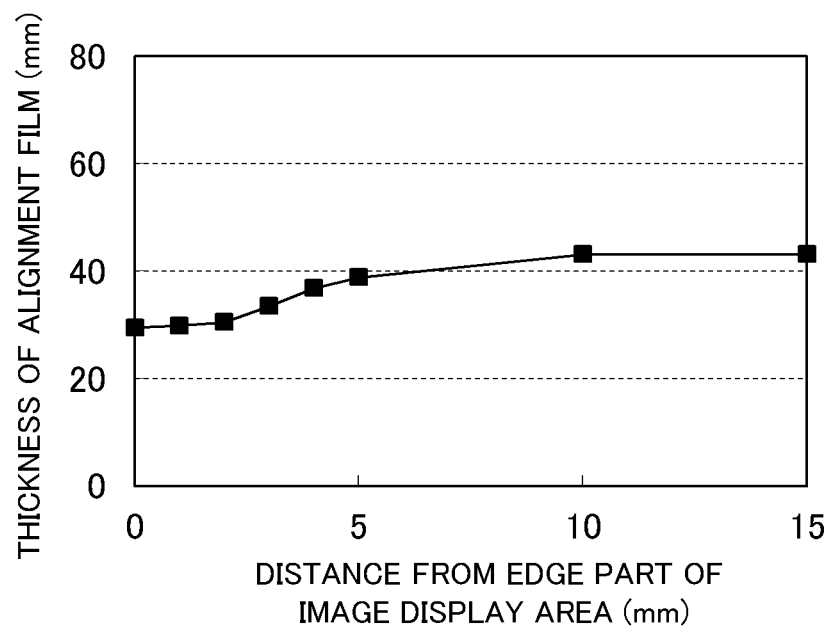
FIG. 10 is a graph showing the measurement result of the thickness of an alignment film that is formed by the first forming method.

FIG. 10 shows the measurement result of the thickness of the alignment film AF formed by the first forming method. In FIG. 10, the X axis represents the distance from the edge part of the image display area DIA, and the Y axis represents the thickness of the alignment film AF. Also, here, the edge part of the image display area DIA (near 0 mm on the X axis) corresponds to the first side shown in FIG. 4, and the area of 0 mm to 5 mm corresponds to the edge-part area TD1. That is, the measurement result of FIG. 10 shows a case where, in the second step, droplets of the alignment film material are discharged on the area where the distance from an edge part is 5 mm or greater. As shown in FIG. 10, it can be seen that the thickness of the alignment film AF gradually changes (becomes thinner) nearer the edge part (the first side) of the image display area DIA. Also, inside the image display area DIA, the thickness of the alignment film AF is the thinnest in the edge part (the first side) of the image display area DIA.

In this way, when the thickness of the film changes gradually, the display brightness also changes gradually in accordance with changes of the thickness of the film, so that it becomes difficult to see irregularities in the display by sight. Consequently, it is possible to reduce irregularities in the display due to variability in the thickness of the alignment film AF. Note that, in FIG. 10, the thickness of the alignment film AF in the area 10 mm to 15 mm from the edge part of the image display area DIA is approximately the same as the thickness of the alignment film AF in the center part of the image display area DIA.

Here, the thickness of the alignment film. AF in the edge-part area TD is preferably 10 nm to 20 nm thinner than the thickness of the alignment film AF in the center part. In the above example, the thickness t1 of the alignment film AF in the edge part (the first side) of the image display area DIA is approximately 30 nm, and the thickness t2 of the alignment film AF in the center part is approximately 43 nm, so that the thickness t1 is 13 nm thinner than the thickness t2.

Note that, although, with the above forming method, the alignment film material is applied twice, the number of times of application is not limited to this, and it is equally possible to apply the alignment film material three times or more. Also, for example, when the number of times of application is three times, it may be possible to discharge droplets of the alignment film material over the entire image display area DIA in the first application step and the second application step, and discharge droplets of the alignment film material in the area excluding the edge-part area TD, in the third application step. Alternatively, it is also possible to discharge droplets of the alignment film material over the entire image display area DIA in the first application step, and discharge droplets of the alignment film material in the area excluding the edge-part area TD in the second application step and the third application step.

[Second Forming Method]

With the second forming method, the amount of droplets of the alignment film material to discharge on the edge-part area TD of the image display area DIA is made smaller than the amount of droplets of the alignment film material to discharge on the area on the inner side of the edge-part area TD. To be more specific, in the control part 15, the amount of discharge (the amount of droplets to discharge) in the nozzles 12 that discharge the alignment film material is controlled by controlling the applied voltage of piezo elements (not shown) connected to the head 13. For example, in the edge-part area TD of the image display area DIA, the applied voltage is set lower, and the amount of droplets of the alignment film material to discharge is made smaller. In the area on the inner side of the edge-part area TD, the applied voltage is set higher, and the amount of droplets of the alignment film material to discharge is made bigger. By this means, the alignment film AF shown in FIG. 5 and FIG. 6 is formed.

Note that, as another method of the second forming method, it is also possible to, in the edge-part area TD (for example, in the edge-part area TD1 shown in FIG. 4), gradually make the amount of droplets of the alignment film material to discharge bigger by making the applied voltage higher from the edge part (the first side) toward the inner area, make the amount of droplets of the alignment film material to discharge constant by making the applied voltage constant, in the area on the inner side of the edge-part area TD, and gradually make the amount of droplets of the alignment film material to discharge smaller by making the applied voltage lower nearer the edge part (the second side), in the edge-part area TD2.

With the second forming method, the same advantages can be achieved as by the first forming method. Note that, with the second forming method, the number of times of application may be once or may be a number of times.

[Third Forming Method]

With the third forming method, when droplets of the alignment film material are discharged on the edge-part area TD of the image display area DIA, the relative speed of the substrate 20 and the head 13 is made faster than the relative speed of the substrate 20 and the head 13 when droplets of the alignment film material are discharged on the area on the inner side of the edge-part area TD. Note that the speed at which the substrate 20 and the head 13 move is controlled by the control part 15. Also, with the third forming method, the amount of discharge of the alignment film material (the amount of droplets to discharge) is controlled to be the same amount over the entire image display area DIA.

By this means, the amount of droplets of the alignment film material to discharge on the edge-part area TD of the image display area DIA becomes smaller than the amount of droplets of the alignment film material to discharge on the area on the inner side of the edge-part area TD. Consequently, the thickness of the alignment film AF in the edge-part area TD becomes thinner than the thickness of the alignment film AF in the area on the inner side of the edge-part area TD. By this means, the alignment film AF shown in FIG. 5 and FIG. 6 is formed. Consequently, with the third forming method, the same advantages can be achieved as by the first forming method. Note that, with the third forming method, the number of times of application may be once or may be a number of times.

Although methods of forming the alignment film for the TFT substrate SUB1 have been shown with the above description, the alignment film for the CF substrate SUB2 can be formed by the same methods as well.

With the liquid crystal display device and its manufacturing method according to the present embodiment, the thickness of the alignment film becomes gradually thinner nearer the edge parts in the edge-part areas of the image display area. Consequently, in the edge parts of the image display area, it is possible to reduce irregularities in the display that are produced as the alignment film material swells and the thickness of the alignment film becomes thicker. Consequently, it is possible to reduce irregularities in the display due to variability in the thickness of the alignment film.

While there have been described what are at present considered to be certain embodiments of the application, it will be understood that various modifications may be made thereto, and it is intended that the appended claims cover all such modifications as fall within the true spirit and scope of the invention.

What is claimed is:

1. A liquid crystal display device, comprising:
    a first substrate on a back surface side and a second substrate on a display surface side, the first substrate and the second substrate being placed opposite to each other via a liquid crystal layer;
    the first substrate comprising:
        a plurality of gate lines extending in a row direction that are formed thereon;
        a plurality of data lines extending in a column direction that are formed thereon;
        a plurality of pixel electrodes and a plurality of thin film transistors that are placed respectively in association with a plurality of pixels that are formed in the row direction and the column direction; and an alignment film formed thereon, wherein a thickness of the alignment film in an edge-part area that is an area of a predetermined width from an edge part of an image display area that is formed with the plurality of pixels, is thinner than the thickness of the alignment film in a center part of the image display area, and wherein the alignment film has an inclined surface inside the edge-part area that is inclined such that the thickness of the alignment film in the edge-part area becomes continuously thinner across a width of the edge-part area.

2. The liquid crystal display device according to claim 1, wherein the thickness of the alignment film of the edge part is the thinnest in the image display area.

3. The liquid crystal display device according to claim 1, wherein the predetermined width has a range of 1 mm to 5 mm.

4. The liquid crystal display device according to claim 1, wherein the thickness of the alignment film in the edge part of the image display area is 10 nm to 20 nm thinner than the thickness of the alignment film in the center part.

5. The liquid crystal display device according to claim 1, wherein the predetermined width in an edge-part area that neighbors an area where a drive circuit is formed is wider than the predetermined width in another edge-part area that is located on an opposite side from the area where the drive circuit is formed and that faces the edge-part area.

6. The liquid crystal display device according to claim 1, wherein a photo-alignment process is applied to the alignment film.

7. The liquid crystal display device according to claim 1, wherein the alignment film extends beyond the image display area and reaches a frame area that surrounds the image display area, a thickness of the alignment film that extends into the frame area is thinner than the thickness of the alignment film formed inside the edge-part area.

* * * * *